(12) United States Patent
Giordano et al.

(10) Patent No.: US 10,165,416 B2
(45) Date of Patent: *Dec. 25, 2018

(54) INDOOR POSITIONING AND COMMUNICATIONS SYSTEM

(71) Applicant: LiveSentinel, Inc., Bradford, MA (US)

(72) Inventors: John Giordano, Klienburg (CA); Mark A. Gordon, Thornhill (CA); Kevin Moroz, Bradford, MA (US); Pratik Rawal, Brampton (CA); Vadim Lica, North York (CA)

(73) Assignee: LIVESENTINEL, INC., Bradford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,469

(22) Filed: Dec. 13, 2017

(65) Prior Publication Data

US 2018/0103353 A1    Apr. 12, 2018

Related U.S. Application Data

(63) Continuation of application No. 15/176,493, filed on Jun. 8, 2016, now Pat. No. 9,877,164.

(Continued)

(51) Int. Cl.
| | |
|---|---|
| *H04W 4/04* | (2009.01) |
| *G08B 25/12* | (2006.01) |
| *H04W 40/24* | (2009.01) |
| *G01C 21/20* | (2006.01) |
| *G01S 5/00* | (2006.01) |

(Continued)

(52) U.S. Cl.
CPC .......... *H04W 4/043* (2013.01); *G01C 21/206* (2013.01); *G01S 5/00* (2013.01); *G01S 5/0036* (2013.01); *G01S 5/02* (2013.01); *G01S 11/06* (2013.01); *G08B 25/12* (2013.01); *H04W 40/244* (2013.01); *G08B 21/24* (2013.01); *G08B 25/016* (2013.01); *G08B 29/181* (2013.01)

(58) Field of Classification Search
CPC .... G08B 21/24; G08B 25/10; G08B 13/2462; G08B 21/0227; G08B 21/0269; G08B 21/0277; G08B 21/182; G08B 3/1083
USPC .......................................... 340/8.1
See application file for complete search history.

(56) References Cited

U.S. PATENT DOCUMENTS

| | | | |
|---|---|---|---|
| 9,520,250 B2 * | 12/2016 | O'Keeffe | H04W 4/21 |
| 2011/0149934 A1 * | 6/2011 | Dickson, Jr. | H04W 64/00 |
| | | | 370/338 |

(Continued)

OTHER PUBLICATIONS

Non-Final Office Action in U.S. Appl. No. 15/176,493, dated Jun. 8, 2017; 7 pages.

(Continued)

*Primary Examiner* — Mark Blouin
(74) *Attorney, Agent, or Firm* — Schmeiser, Olsen & Wtts LLP

(57) ABSTRACT

The inventive concepts provides indoor positioning capabilities and door monitoring to facilities including but not limiting to day care providers and elderly care facilities in order for them to be able to quickly position someone inside the building as well as to be forewarned when they are going somewhere they shouldn't be i.e. near an exit way. The system also offers two way communications to the staff in the facility when a management server is implemented.

17 Claims, 9 Drawing Sheets

Related U.S. Application Data

(60) Provisional application No. 62/174,220, filed on Jun. 11, 2015.

(51) Int. Cl.
    *G01S 5/02*     (2010.01)
    *G01S 11/06*     (2006.01)
    *G08B 21/24*     (2006.01)
    *G08B 25/01*     (2006.01)
    *G08B 29/18*     (2006.01)

(56) References Cited

U.S. PATENT DOCUMENTS

| | | | |
|---|---|---|---|
| 2012/0190386 A1* | 7/2012 | Anderson | G01C 15/04 |
| | | | 455/456.3 |
| 2015/0084745 A1 | 3/2015 | Hertz et al. | |
| 2016/0094953 A1* | 3/2016 | Russ | H04W 4/70 |
| | | | 455/404.2 |
| 2016/0239733 A1 | 8/2016 | Hertz et al. | |
| 2016/0335876 A1 | 11/2016 | Verma | |
| 2017/0055126 A1 | 2/2017 | O'Keeffe | |

OTHER PUBLICATIONS

Notice of Allowance in U.S. Appl. No. 15/176,493, dated Sep. 13, 2017; 7 pages.

* cited by examiner

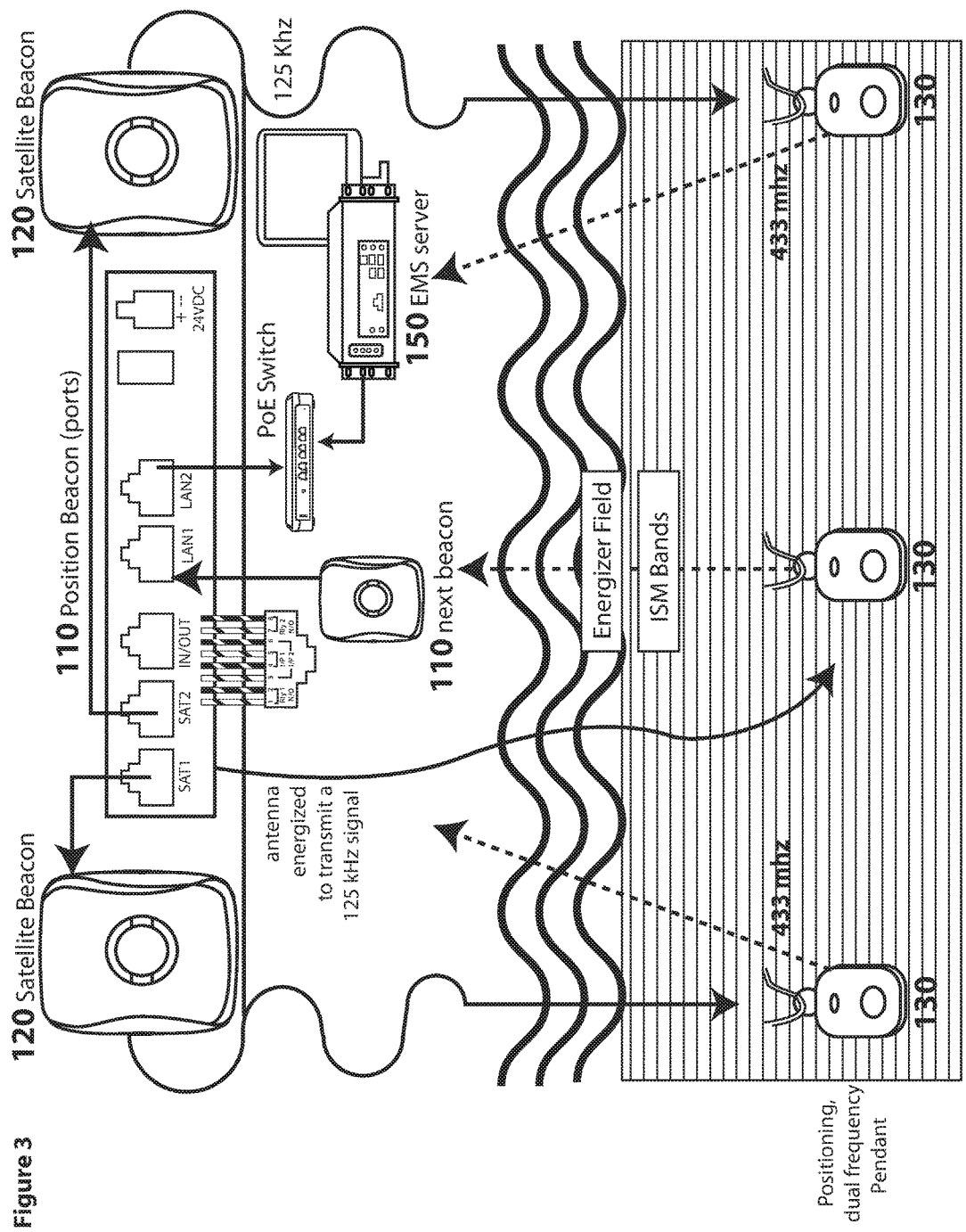

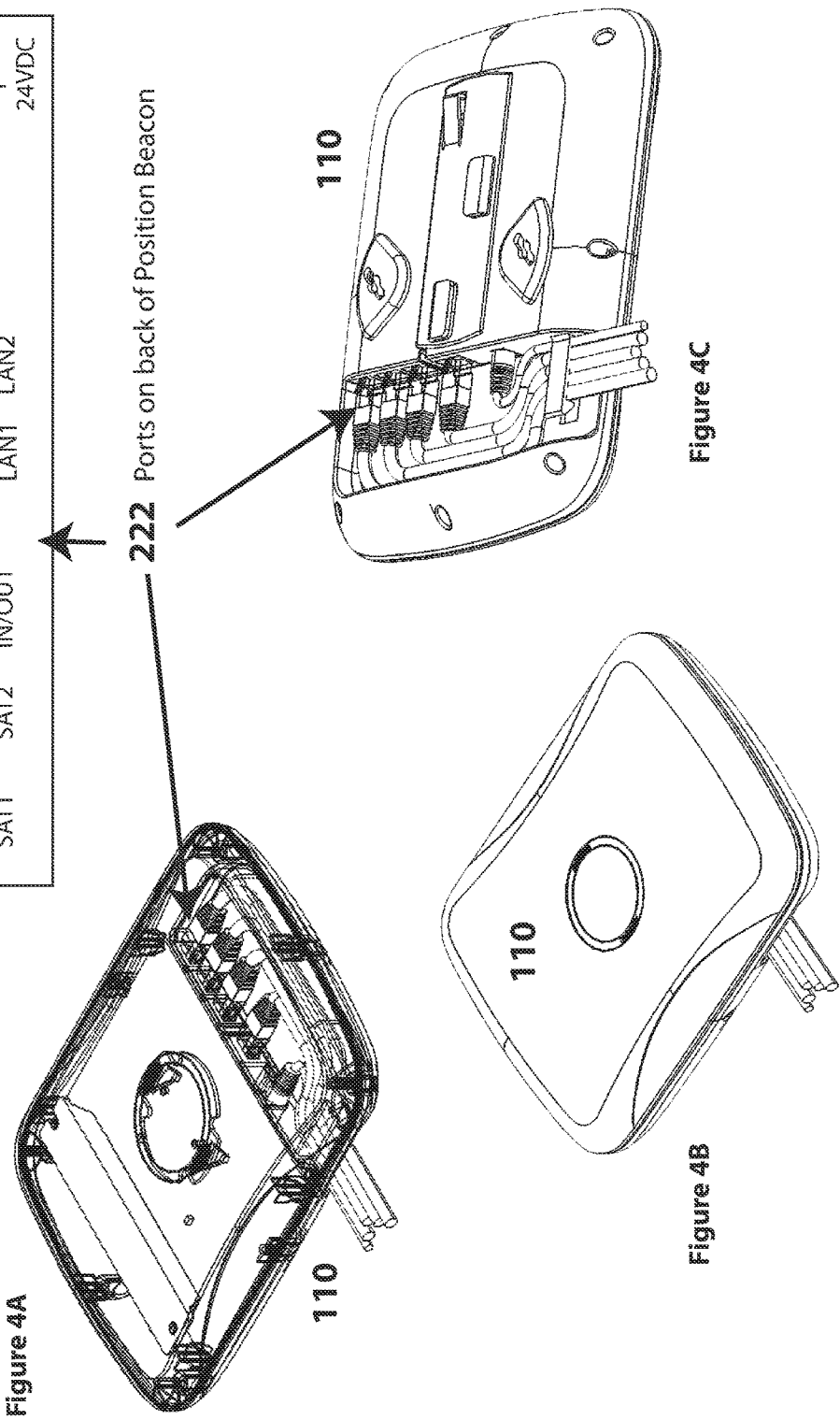
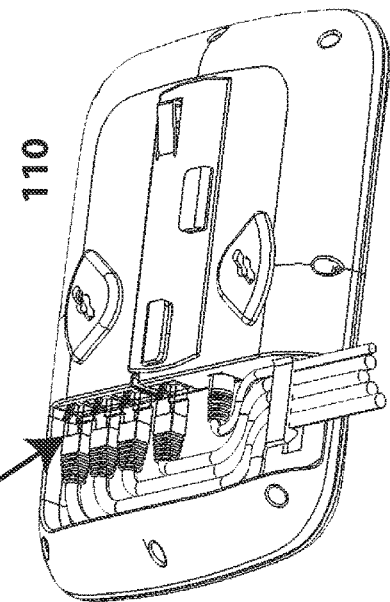
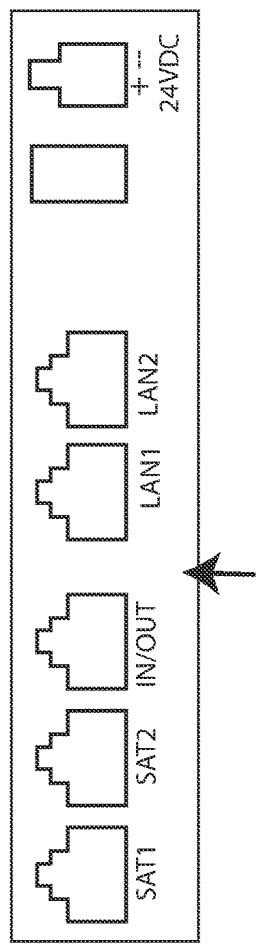
Figure 4A
Figure 4B
Figure 4C

Figure 9

Quality Care Through Innovative Solutions

LIVE SENTINEL

- Setup ⌄
- Rooms
- Equipment ⌄
- Patients
- Reports ⌄
- NCS Settings
- Users
- Live Panel
- Logout (Admin EMS)

Room Total

Patients

Calls this month (589)

Missed Calls (20)    SMS Events

Escaltion Time (34)    Voice Events

Response Time (34)    Email Events

INDOOR POSITIONING AND COMMUNICATIONS SYSTEM

RELATED APPLICATIONS

This application is a continuation application of U.S. patent application Ser. No. 15/176,493 filed Jun. 8, 2016, entitled "INDOOR POSITIONING AND COMMUNICATIONS SYSTEM," which in turn claims priority to U.S. Provisional Application Ser. No. 62/174,220, filed on Jun. 11, 2015 entitled "INDOOR POSITIONING AND COMMUNICATIONS SYSTEM", the entirety of each of which is incorporated by reference herein.

FIELD OF INVENTION

The inventive concepts relate generally to technology related to the location of people and/or objects, and more specifically to systems and methods for positioning people and assets inside a building.

BACKGROUND OF INVENTION

Global positioning (GPS) systems often do not function inside a building since there is no direct signal path between the satellite signal to the device inside the building. In particular, the frequencies at which GPS signals operate do not typically permit the transmission though certain solid objects. There is a strong desire to be able to position people and equipment inside a building in a cost effective fashion, and in a manner that overcomes the foregoing.

SUMMARY OF THE INVENTION

A feature of the invention is that it provides for a system and method that transmit downstream a low frequency energizer radio frequency identification (RFID) "wakeup" beam, also referred to as an energizing signal, or the like, for example, having a frequency around 125 KHz from specific beacons, for example, position beacon (mPB) devices and position satellite beacon (mPS) devices (generally referred to as beacon devices, or beacons). A beacon device includes an antenna, for example, an internal antenna. An mPS device may be positioned a predetermined distance from an mPB device, and may increase a range of the mPB device, for example. A remote processor can control an external antenna such as the mPS device in a manner as an internal antenna. In other words, the mPB and mPS may each include a similar antenna. The mPB is referred to as a "beacon" or "beacon device", since it communicates with a pendant, tag, or related electronic device. A difference between the mPB and the mPS is that the mPB includes a processor for perform functions in accordance with embodiments here, while the mPS is constructed and arranged to extend the effective range of the system, but transmitting a beam via its antenna.

The mPS device may extend the range of a beacon by a significant distance, for example, 30 feet with 15 feet on each side of the beacon, for example, to a whole wing or long hallway of a building. An example of a position beacon may be provided as a LiveSentinel™ product, several of which may be positioned throughout a facility in order to be able to read pendants or tags that are located on people or equipment. The more mPB devices in the facility, the higher the degree of accuracy one can position a person or thing. The Position Satellites communicate with the position beacon devices to increase the range of an area to be monitored.

The beacon devices may be located in a hallway mounted on the ceiling, but could also be put into individual rooms. When an electronic pendant comes into range of one of the mPB's or mPS's the energizer beam "wakes up" the pendant The pendant in some embodiments provides two functions. The first is to generate a signal that serves as a call for help when a button is pressed or the pendant is otherwise activated. The second function is that the pendant wakes up when energized (for example, remotely as described in embodiments herein) and reports back what position beacon device and/or position satellite beacon device just woke it up so that the system can determine where in the building the user of the pendant is at and the pendant determines whether to make a supervisory call to the mPB in order to alert the server that a new pendant has come into its proximity. The signal uses a different Industrial, Scientific or Medical (ISM) frequency to call the mPB. The supervisory call is transmitted over a network, e.g., Ethernet or Wi-Fi, back to an event management server (EMS) to take note of the pendant in this area. The EMS is a special-purpose computer device, for example, operated by software, whose primary function is to keep track of all the messages that are coming in from the mPBs in a particular configuration. Alternatively, in embodiment where there is no EMS server, then an email or SMS message can be sent to a mailbox, pager, or cellular device. The EMS server is much more sophisticated and has mapping capabilities to enable staff to be able to see where the pendants are positioned in real time. A feature of the inventive concepts permits a person to be tracked indoors within a predetermined region, for example, within a 32 foot radius of one of the mPB's or mPS's. The pendant or tag battery life can be dramatically increased with this architecture since it is not polling constantly to the beacon devices.

In one aspect, provided is a system for positioning, comprising: at least one position beacon device that generates an energizing signal; at least one pendant that is energized by the energizing signal, and includes a button that when pressed generates a signal to provide a location of the pendant, and an event management server that communicates with the pendant, and receives data regarding a location of the pendant.

In another aspect, provided is a method for positioning, comprising: polling by a position beacon device or satellite antenna device a low frequency signal; receiving, by a pendant, the low frequency signal; waking up the pendant with the energized signal, requiring the pendant to determine if it is the same position beacon device or satellite antenna device that woke it up previously; and determining whether to send a supervisory message to an EMS server.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 3 is another diagram illustrating an operational exchange between elements of a positioning and communication system, in accordance with some embodiments.

FIG. 4A is a perspective view of a front interior region of a beacon device, in accordance with some embodiments.

FIG. 4B is a perspective view of the exterior of the beacon device of FIG. 4A.

FIG. 4C is a perspective view of rear interior region of the beacon device of FIGS. 4A and 4B.

FIG. 9 is a screenshot of an event management server (EMS) main screen used to track the pendants on the screen, in accordance with some embodiments.

DETAILED DESCRIPTION

Technologies need to be implemented in order to be able to position people or objects inside a building. As the population continues to age, people are living longer and are more likely to develop dementia or related debilitating diseases. Therefore, the features of the inventive concepts may be useful in positioning patients.

Figure 1:
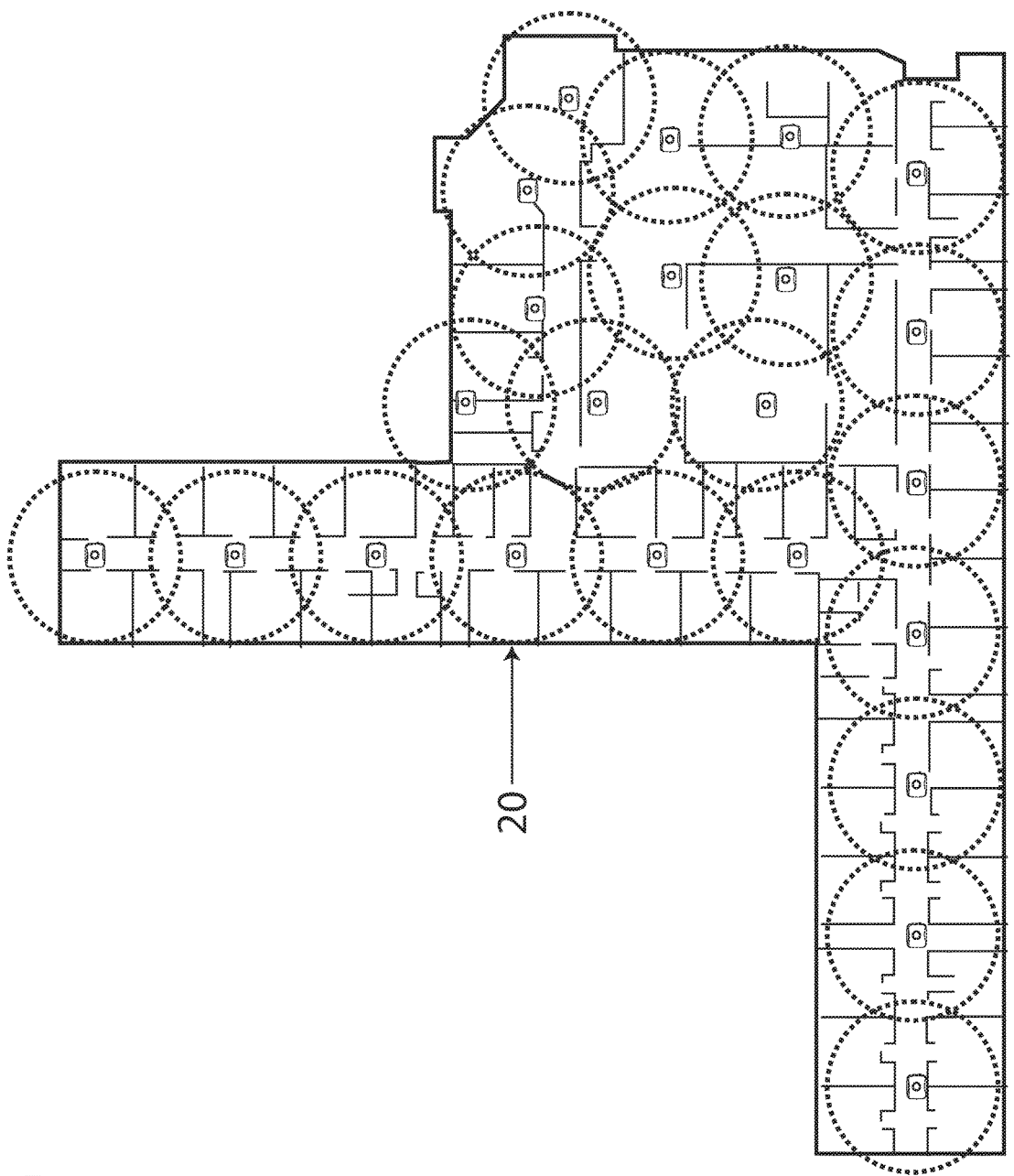
FIG. 1 is a diagram of a floor plan illustrating the range of operation of a positioning and communication system implemented in a building, in accordance with some embodiments.

For example, shown in FIG. 1, an indoor positioning and communication system in accordance with some embodiments may broadcast a signal or beacon 20 throughout a facility regardless of location in the facility of a wearer of a receiver of the beacon 20. Each circle 20 in FIG. 1 may refer to a beam output by a position beacon device 110 alone or in combination with a satellite beacon device 120, for example, a 15 radius. Thus a position beacon device 110 may be 30 feet or so from a neighboring beacon device or satellite beacon device 120. The wearer may be placed, or positioned, in a particular room of the facility, for example, a long term care facilities who may be a flight risk. It is also advantageous for staff to know where residents or patients are in order to give them their medications and if they know the whereabouts of where they are they can save time trying to track them down. Some facility owners may also use the system to track and position staff members.

Figure 2:
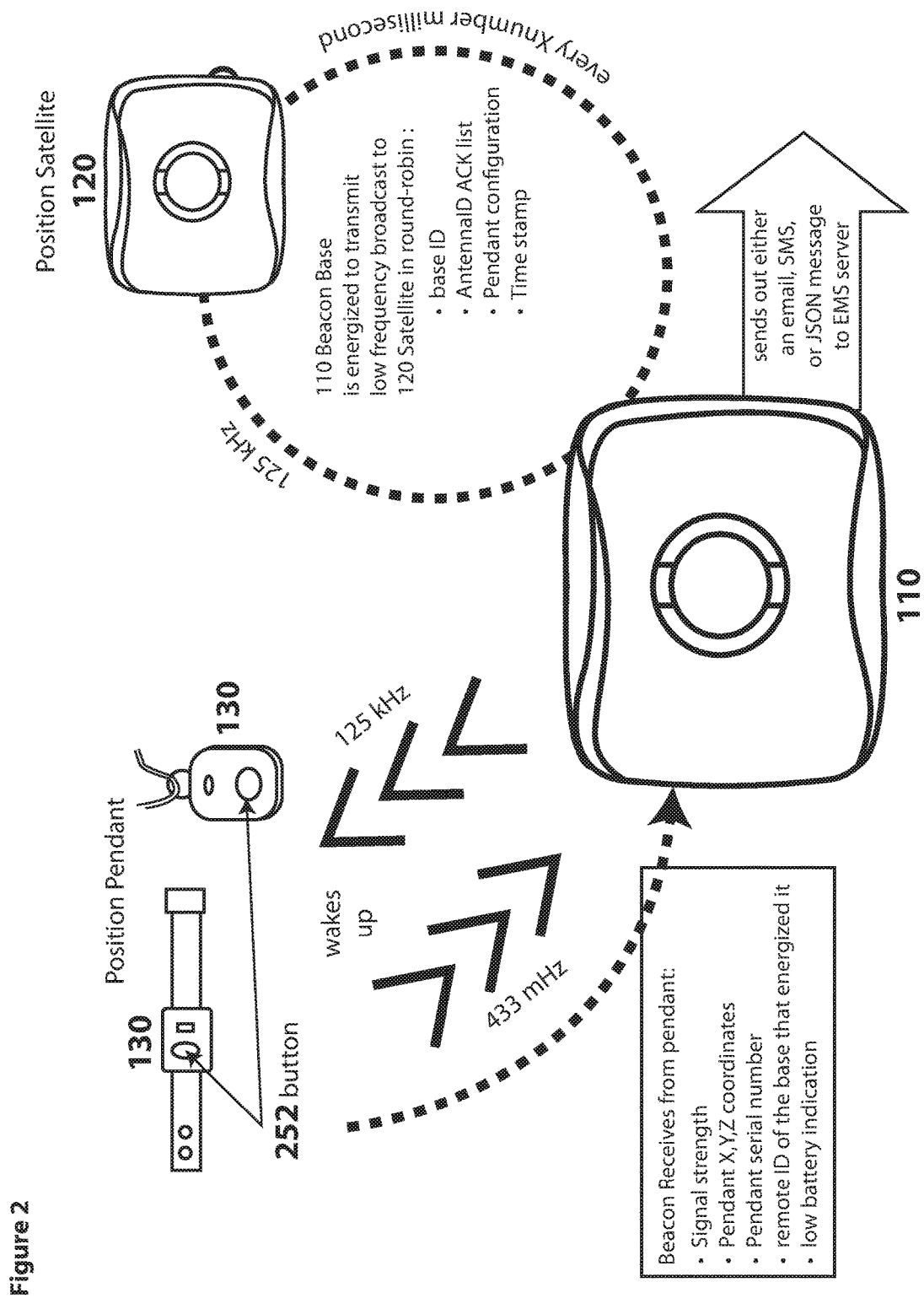
FIG. 2 is a diagram illustrating an operational exchange between elements of a positioning and communication system, in accordance with some embodiments.

In brief overview, as shown in FIGS. 1 and 2, a beacon device, which may a position beacon device 110 alone or in combination with a satellite beacon device 120, may energize its antenna, described in some embodiments herein. A determination is made whether a pendant 130 generates a signal received by the beacon device. Once the beam is picked up by the pendant 130, it contacts the position beacon device 110, which in turn generates and outputs a data packet either via email, short message service (SMS), or JSON to a server with information that an event has occurred. For example, the data packet may be formatted and output as an email, short message service (SMS), JavaScript Object Notation (JSON) or other electronic communication, which is output is sent to an EMS server 150 (shown in FIG. 3). If no, then the pendant 130 returns to a sleep mode.

In accordance with some embodiments, the system comprises the following components:

Position Beacon (mPB)

A position beacon 110 in accordance with some embodiments provides primary processing functions of the system, as shown.

Beacons, which may comprise one or more position beacon devices 110 and position satellite beacon devices 120, provide the primary processing functions of the system. Typically positioned in hallways, beacons receive signals from pendants and pull cords. The range of a beacon depends on its functionality and the components that are connected to it. If only pullcords or the like are connected to the system, beacons have a range of about 100 feet, allowing the system to spread the beacons far from each other. However, if pendants 130 are used, they typically have a line of site of 50 feet with nothing in the way. When a position beacon 110 is used, the range of the positioning component is typically around 20 feet in both directions of the beacon device 110. When a wall is positioned between the pendant 130 and the beacon, the range could go down to 25 feet. The position beacon device 110 includes an antenna (not shown since in this embodiment the antenna is internal). When turned on, the antenna outputs a burst of energy or beam at configurable intervals, which includes the base identification number of the beacon device 110 if a beacon device 110 sent the beam or the satellite identification number if a position satellite beacon device 120 sent it. Also included in the beam is the time stamp and the Acknowledgement (or ACK) list, which is a list of all pendants 130 that are part of the table. The processor of the beacon device 110 polls its antenna, as well as the antennas in the satellite beacon devices 120, for any changes in their pendant's ACK list, enabling it to inform the EMS server of any changes in movement. If there is no EMS server, the information can be sent via email instead.

Beacon devices 110 listen for events, typically at or about a 433 MHz frequency. A beacon device may be positioned, for example, in the middle of four rooms for coverage if pendants are involved. This will ensure that each pendant and pull cord is able to generate an event that will be processed by the beacon when the buttons are pressed. Be sure to test the pendants and pull cords during installation to make sure they are in range of the beacon.

Figure 8:
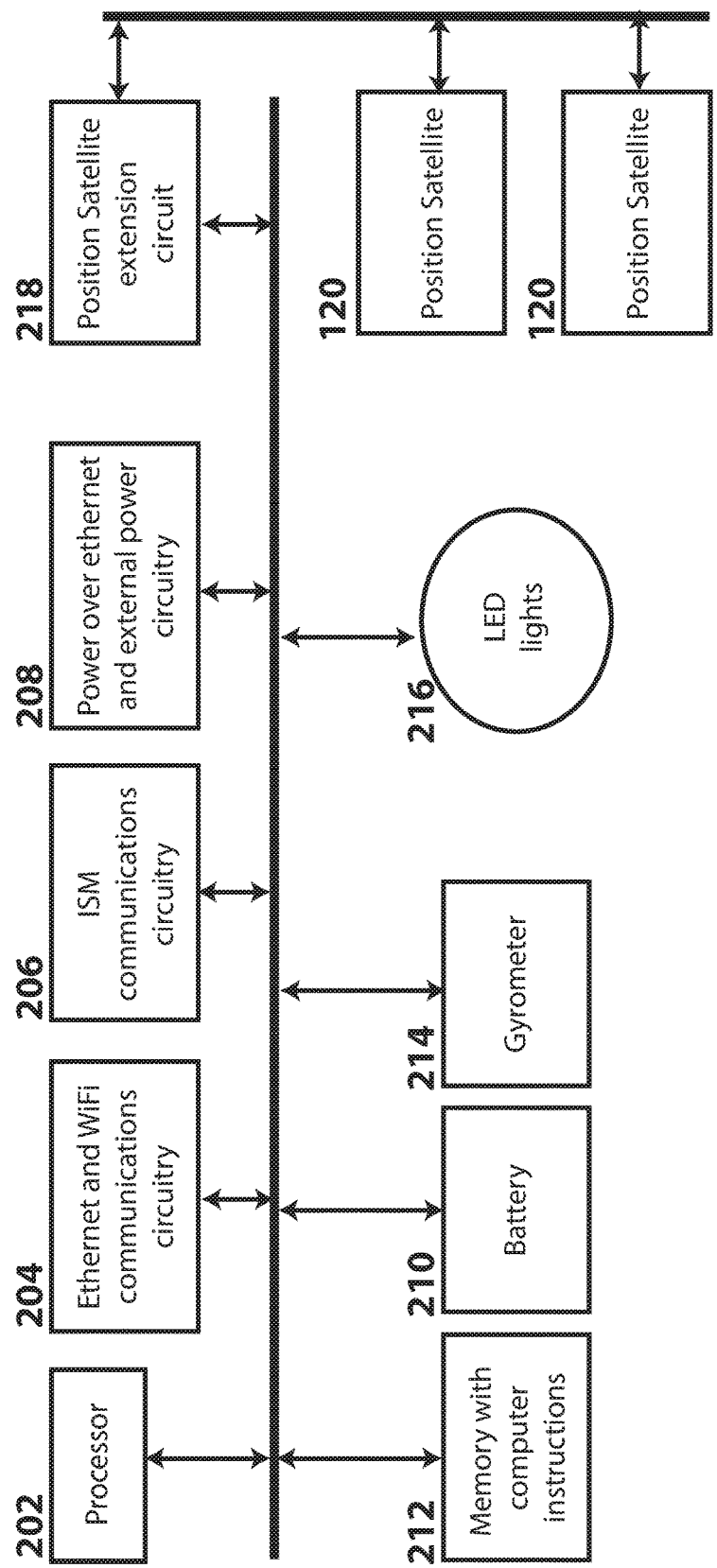
FIG. 8 is a block diagram of elements of a beacon device, in accordance with some embodiments.

As shown in FIG. 8, a position beacon 110 comprises a central processing unit (CPU) 202, a memory 212, a battery 210, network interfaces 204, 208, for example, Wi-Fi and Ethernet physical Interfaces, a power connector (not shown), one or more RJ-45 connectors 222 (FIG. 4A) or other satellite extension circuit 218 for optional position satellite beacon devices 120 and/or relay ports, shown by a tag, sticker, or other identification 223 shown in FIG. 4A. The relay ports can be configured for inputs or outputs and can be used to control door access via a door striker or bell and inputs from dry contacts like motion sensors are some examples for their intended uses. Other elements of the position beacon 110 may include but not be limited to ISM communications circuitry 206, external dry contact input and relay output circuitry 210, LED lights 216, and/or gyrometer 214.

Integrated into the position beacon device 110 is a network protocol, e.g., internet protocol (IP) stack which permits the position beacon device 110 to be configured as an entity on the network with its own IP address. It supports a discovery protocol to be able to query for a Management Server and if it discovers one it can download its configuration file and announce itself on the network. Its network interface supports Power over Ethernet (POE) to alleviate the need for external power. However an external power port is provided in case POE is not available. If the unit is powered externally it can take advantage of its Wi-Fi capabilities and a category 5 Ethernet cable is not required to be run back to the wiring closet. The system also acts as a Wi-Fi access point that is used to communicate with the staff's Wi-Fi enabled communication devices. There are two lights on the device that are in use when the device transmits (red) or receives (green) a signal. These lights can be turned off via software if desired. A full protocol stack is implemented to communicate with an Event Management Server (EMS) 150 in order for it to constantly send messages so it knows where the pendants 130 are. There is also a motion sensor in the beacon device 110 that can sense motion so staff can be alerted if someone is in the area without a pendant 130 on. This can be useful if the pendant 130 is removed and it is after hours with limited staff. The position beacon device 110 has an optional battery backup that is trickle charged from the POE switch.

When the antenna is turned on it will output a burst of energy or beam every X number of seconds where X is configurable. The beam sends down its base identification number if it is a beacon or a satellite identification number if it is a position satellite beacon device 120, a time stamp, and the Acknowledgement (ACK) list. The ACK list is the list of all the pendants 130 that are in its table. Therefore the pendant 130 can determine if it is in this beacons list already to alleviate the need to make another supervisory call back to the EMS server which taxes the battery. The processor of the position beacon device 110 polls its internal antenna as well as the antennas in the satellites for any changes in their pendants ACK list so it can tell the EMS server 150 if there are any changes in movement. If there is no EMS server 150 it can email or SMS the messages out instead.

Position Satellite Beacon Device (mPS)

In brief overview, the main function of a position satellite beacon device 120 is to increase the range of the beacon device's locus. This is important when you want to ensure that the positioning is accurate. For example, if someone runs under a beacon quickly, it may not pick it up in time, but a position satellite beacon device 120 on each side of the beacon will correct this.

The position satellite beacon device 120 connects to the position beacon device 110 via a Category 5 twisted pair cable or other electrical connector where it also derives its power, in addition to being used for the communications link. In particular, the satellite beacon 120 has an antenna in it that connects back to the beacon device 110 over an Ethernet cable or the like. The CPU 292 of the beacon device 110 wakes up the antenna in the satellite device 120 every x number of seconds and broadcasts the ACK list and a timestamp that the pendant 130 hears. The distance that the satellite antenna expands the range is the same as the beacon itself, which is about 20 feet in both directions. Therefore, if a beacon device 110 has both position satellite beacon device 120 attached to it, the range should be about 80 feet.

The satellite device's antenna contains a unique identifier that is sent back to the beacon, which in turn transmits the data to the EMS server so that it can distinguish if the pendant is closer to the position satellite beacon device 120 or the beacon device 110 based on the signal strength, which the pendant 130 sends to the beacon device 110.

As previously described a position satellite beacon device 120 may be in electrical communication with the position beacon device 110. The position satellite beacon devices 120 are just external antennas which are much cheaper than a beacon since it has no PCB board in it. It is a clever way to extend the range which is also what we are trying to protect.

Figure 7:
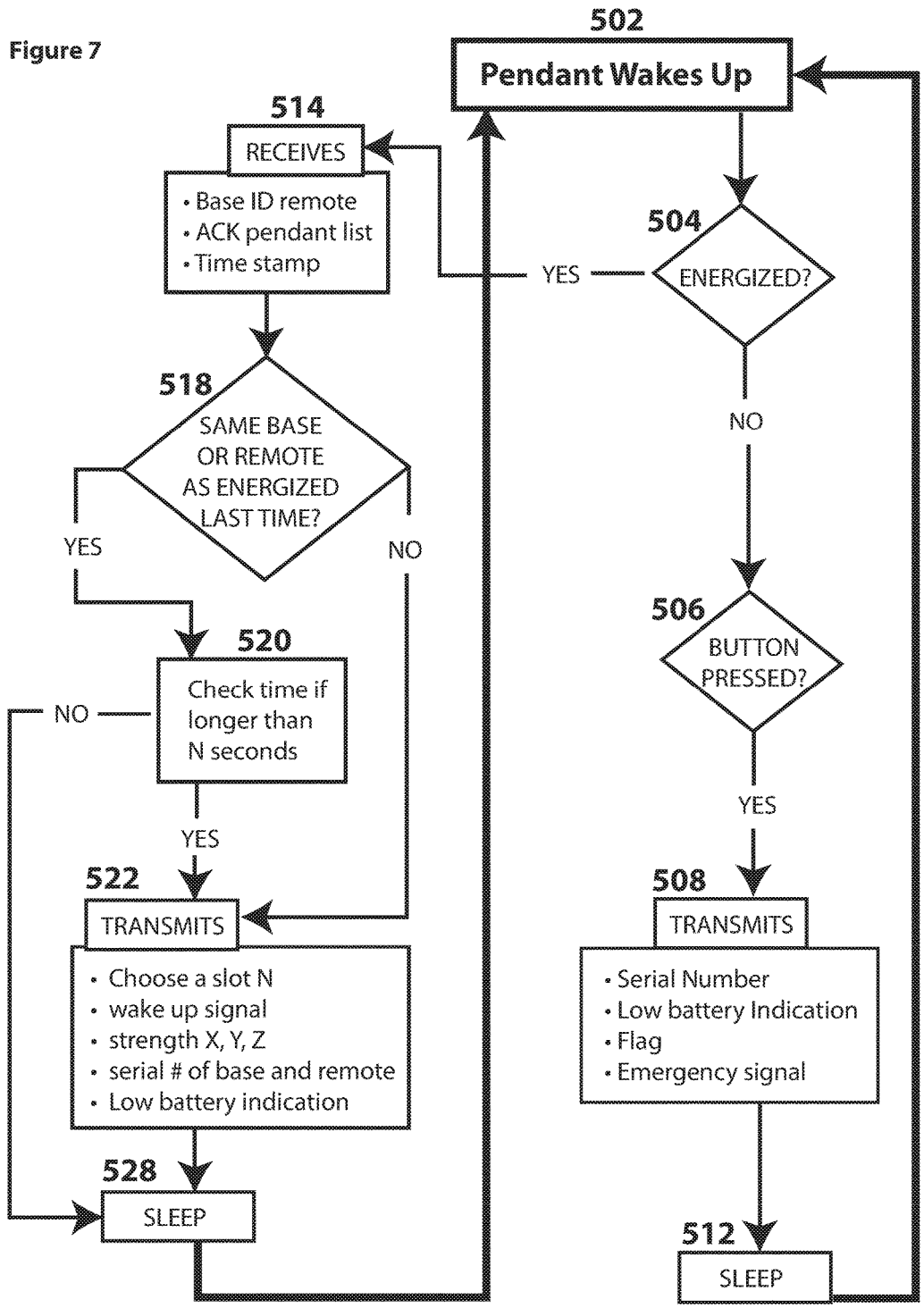
FIG. 7 is a flowchart of an operation of a pendant, in accordance with some embodiments.

If you open up a beacon you will see an antenna in it with the PCB in schematic in FIG. 7. If one opens up a position satellite beacon device 120, one will just see the antenna via a Category 5 twisted pair cable where it also derives its power in addition to being used for the communications link. The position satellite beacon device 120 and position beacon device 110, or base, may coexist under a same building or structure, or may be at remote locations. An external power connector is also optional on the Position satellite beacon device 120 which is useful if the distances between the position beacon device 110 and position satellite beacon device 120 exceeds 30 feet. The antenna that is in the position satellite beacon device 120 contains a unique identifier which is sent back to the position beacon device 110 which in turn transmits the data to the EMS server in order to be able to distinguish if the pendant 130 is closer the beacon device 110 or the satellite device 120 based upon the signal strength in case the position beacon device 110 and position satellite beacon device 120 both pick up the pendant 130.

Referring again to FIG. 1, the position beacon device 110 alone or in combination with the satellite beacon device 120 may produce a beam 20 having a desired radius, which in combination with other predetermined device locations can cover a facility in order to excite a pendant 130. If the pendant is on one of the unions of overlapping circles 20, it can send two supervisory packets back to the server: one with a satellite device 120 as the identified device and the other as the beacon device 110 as the identified device, and the server may analyze the signal strength to determine which device, i.e., position beacon device 110 or satellite device 120 the pendant 130 is closer to. Since both devices 110, 120 have antennas that could excite the pendant 130 then it could cause the pendant 130 to make to supervisory calls to the beacon (one with antenna id 1 the beacon and one with antenna ID 2 the position satellite beacon device 120. The system looks at the signal strength in the EMS 150 to determine what they were closest to. A supervisory call may take the same power as a button press.

In some examples, supervisory signal is generated by the pendant when it thinks it encountered a new beacon. If the pendant stays under the same beacon it should not generate a lot of supervisory calls which saves the battery life. With respect to pendant battery management, the energizing signal also provides the beacon ID and the pendant will go back to sleep immediately after being energized if it is the same beacon.

Pendant

The pendant 130 is configured to communicate with the beacon device 110, which in turn communicates with other devices such as servers, computers, and so on, for example, described herein.

Figure 6:
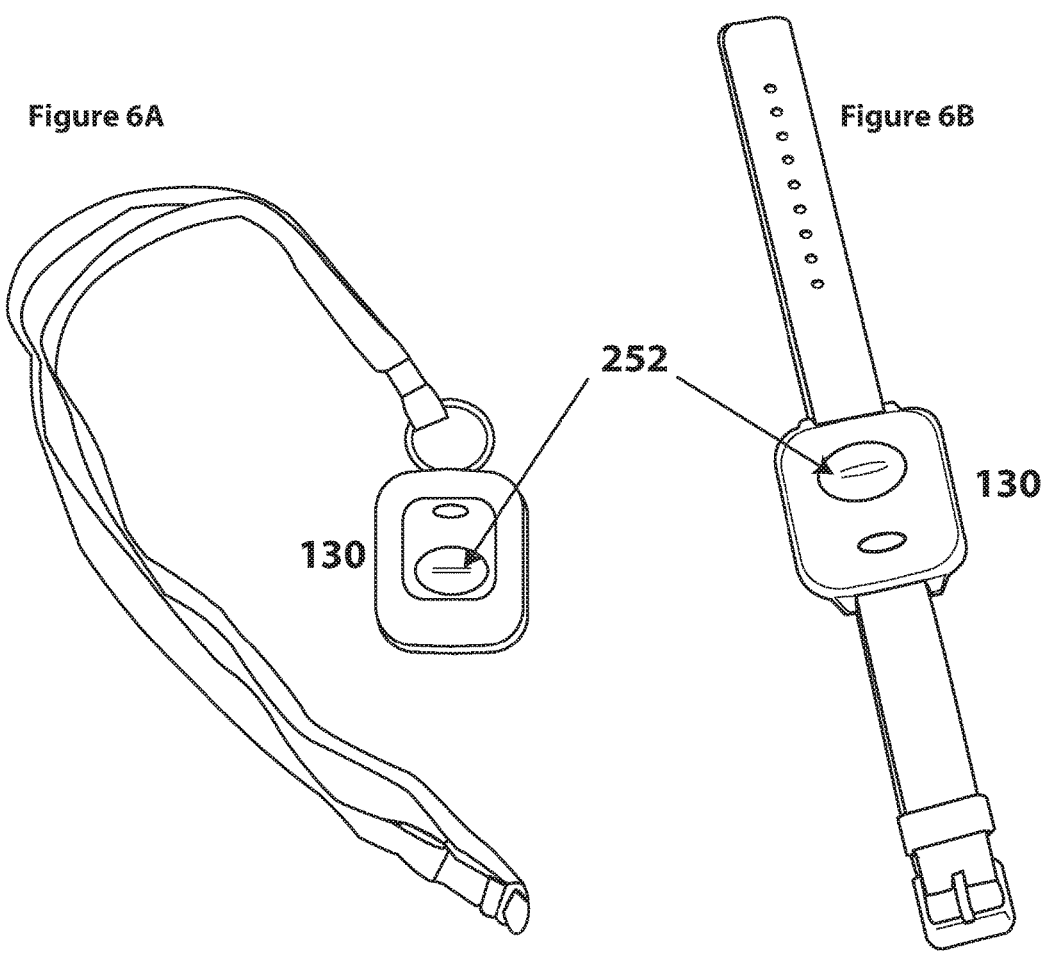
FIGS. 6A and 6B are perspective views of a position pendant, in accordance with some embodiments.

In some embodiments, the pendant 130 comprises a PCB board, an emergency push button 252 (shown in FIGS. 6A and 6B), an accelerometer, a gyrometer, a battery, a transmitter and a receiver. The primary benefit of our solution is extraordinary long battery life of the pendant since it does not have to chirp or broadcast at full power when it comes into proximity of a beacon. Conventional products on the market offer indoor location services the pendants are constantly sending out a signal every X number of seconds which taxes the battery. Embodiments of the invention alleviate this need by "waking up" whenever it notices a beacon location change or waking up in reduced power mode to ensure there has not been a change by reading the ACK list. Therefore if the pendant 130 stays in one location then it is not drawing any or much power until it travels to a different beacon location which may not happen very often in an elderly care facility. The pendant 130 can also have an emergency button 252 on it that can be used whenever help is needed. There is an embodiment of the pendant 130 with no emergency button for memory care patients who would be pressing the button often. The receive and transmit functions operate on different frequencies. The pendant also offers fall down detection when the accelerometer and the gyrometer are triggered and no movement is detected after activation to automatically dial for help. The pendant also features a replaceable battery and is water resistant. When the pendant transmits supervisory information to the base it transmits its serial number, signal strength of the receiving beam, along with the Base ID or Satellite ID it last received the beam from. The pendant also sends a Low Battery Indication when the battery level drops below a preconfigured amount, for example, 2.2 volts. Keeping track of the Base or Satellite ID enables the pendant to determine if the current Beacon is the last one that it communicated with when it woke up last. When the pendant transmits information back to the base it selects a random channel number to alleviate collisions. The pendant transmits to the base its signal strength from the antenna in the x, y and z direction relative to the pendant orientation enabling the system to know its orientation and position in a corridor. Therefore the EMS server ascertains the pendant's position and distance from the Base, and will not have any ghosting problems with a Base on another floor.

Pendants 130 can be worn by residents, patients, or staff and are used by them when they need assistance. For example, a pendant may be part of a watch, tag, necklace, or other wearable apparatus.

Although not shown, a pendant 130 may comprise a printed circuit board (PCB), an emergency pushbutton, a battery, and a transmitter and receiver. A feature is that the battery has an extraordinary long battery life, since it doesn't have to chirp or broadcast at full power when it comes into the proximity of a beacon device 110. Instead, the pendant 130 "wakes up" whenever it notices a beacon location change, or it wakes up in reduced power mode to ensure there has not been a change. As long as the pendant 130 is positioned at one location, it draws very little power, if any, until it travels to a different beacon location, which may not happen very often in an elder care facility or other facility. The battery in the pendant is a standard replaceable battery, and the pendant is water resistant.

The pendant 130 can also have an emergency pushbutton 252 that can be used whenever help is needed. The pendant's signal will typically travel about 50 feet when pressed. Pendants 130 with no emergency button are also available and can be used for memory care patients who might otherwise press the button when help is not actually needed.

The transmit and receive functions operate on different frequencies. When the pendant 130 transmits information to the base, it includes its serial number, signal strength, as well as the Base ID or Satellite ID. The pendant also sends a Low Battery indication when the battery level drops below a predetermined amount, for example, x percent. Keeping track of the Base or Satellite ID enables the pendant to determine if the current beacon is the most recent one that it communicated with when it woke up last. When the pendant transmits information back to the base, it selects a random channel number to alleviate collisions. The pendant 130 transmits to the beacon device 110 its signal strength from the antenna in the x, y, and z direction relative to the pendant orientation, enabling the system to know its orientation and position in a corridor. This enables the EMS server 150 to ascertain the pendant's position and distance from the Base, and in turn prevent any ghosting problems with a Base on another floor.

Event Management Server (EMS)

The EMS 150 is an optional component and is typically used in environments where numerous beacon devices 110, 120 have been installed throughout a facility. The EMS 150 may include a special purpose computer executed by software, with the primary function of keeping track of all the messages that are coming in from the beacon devices 110, 120, for example, exchanging communications with JSON or the like. In situations where there is no EMS server, then an email or SMS can be generated for example, by the beacon device 110. Since each beacon device may include a built-in processor, as well as an IP stack with a built-in email client, it can send email messages directly to an email server. But the EMS server 150 is much more sophisticated and has mapping capabilities that enable staff to see a detailed floor plan of the building and a real-time view of where the pendants 130 are. This permits a person to be tracked indoors within a predetermined region; for example, within a 32-foot radius of one of the beacon devices 110 and/or satellite devices 120. The pendant or tag battery life can be dramatically increased with this architecture.

The EMS server 150 can also be used to send the configuration parameters to the beacon device 110. It is noted that the satellite device 120 does not communicate with the EMS 150 since it does not include a processor to perform this function, and since the satellite device 120 is configured to produce a beam to tickle a pendant 130 to contact the beacon device 110. For example, the system may be configured to inform the beacon device that it has two satellite devices 120 in its cluster, and instruct the beacon device 110 to pull the two satellite devices 120 every 500 ms upon initialization. The configuration parameters would be used to tune the antennas either up or down, depending upon where they are located. Other parameters that can be configured include the IP address of the EMS server, the SMTP server, and any satellites if any are connected to it.

The EMS 150 also houses a database that keeps track of every pendant location change so that reporting can be done for historical determination of where the pendant traversed over a given time period. The EMS server 150 can also interface with the phone system via SIP or Session Initiation Protocol.

Standalone Mode

The EMS is an optional component and the system can run in a standalone mode if a facility wanted to monitor only one area like a doorway. The position beacon device 110 can be configured to send out email or SMS alerts when contacted by the pendant which would alleviate the need for an EMS server. The position beacon device 110 has enough memory in it to store up to 256 pendant serial numbers locally. This enables the position beacon device 110 to make decisions locally in order to control the relay contacts locally. This enables the system to be able to lock or unlock a door based upon the pendant ID. This feature enables staff to be able to go through the door without having to open the door and the door would lock automatically if a dementia patient was in the area. The other relay could be used to turn on a notification light if desired.

The position satellite beacon devices 120 enables the range of one position beacon device 110 to be expanded by 30 feet, or more, in each direction if both ports are populated. This extends the total area of coverage to up to almost 100 feet of coverage. The gap between the position beacon device 110 and the satellite devices 120 can be extended to create a dead spot between the two but you can be pretty certain where the pendant is since it came into range on the outer satellite. This is not recommended but there may be applications where this can be beneficial for indoor tracking. The position satellite beacon device 120 is powered from the position beacon device 110 and no external interface is needed.

Handset Device (HD)

The handset device is a smart phone with the energizer embedded into it so the device can be tracked throughout the facility as well. It is also has a SIP client on it and can receive and send video, audio, and receive event messages from the EMS server 150. The HD has multiple wireless communication paths back to the position beacon device 110 and position satellite beacon device 120.

Operation

Once all of the units are installed throughout a facility the first step is to power on the beacon. Once power is applied the Beacon will broadcast over the Ethernet to find the EMS server via a multicast protocol. Once found it will download its configuration and then it will initialize any Satellites attached to itself according to its configuration file. If no EMS server is available the local configuration will be used. Next it will report back the initialization results to the EMS server. Each position beacon device 110 and position satellite beacon device 120 has a unique code or Device ID that is used to identify itself. This enables the EMS server to distinguish events from position beacon device 110s or satellite beacon devices 120. Once it is operational it will power on the energizer in the position beacon device 110 and broadcast a low frequency signal with the base ID, Acknowledgement Pendant list, Time Stamp, and the Pendant Configuration Parameters. It waits a configurable amount of time and then energizes any satellite beacons antennas attached to it sequentially.

The position beacon device 110 keeps track of all of the pendants that responded back to the beam. Before the Pendant sends any data it first picks a slot to transmit on to avoid any collisions with other pendants in the area. Once the channel is selected It sends the signal strength, its serial number, the Base or Remote ID from the position beacon device 110 or position satellite beacon device 120 that energized it, and if there is a low battery indication. This beacon is constantly polling each antenna and reporting back to the server any changes. The server could be the EMS server 150 or an email/SMS server if in standalone mode. Since the last Device ID that the pendant was near is transmitted in the emergency signal (i.e. when the button is pressed) this alleviates any ghost calls that are inherent with older Nurse Call Systems that would have multiple units trigger and call the Nurse Call Stations whenever an emergency button was pressed. Thus, in some embodiments, when a pendant button 252 is pressed, the last position of a position beacon device 110 or satellite device 120 that energized the pendant 130 may be provided, for example, displayed.

Since the pendant 130 also sends the signal strength from the antennas in the X,Y,Z direction relative to the pendant orientation this enables the system to know its orientation and position in the corridor. I.e. is it upright or lying flat.

Figure 5:
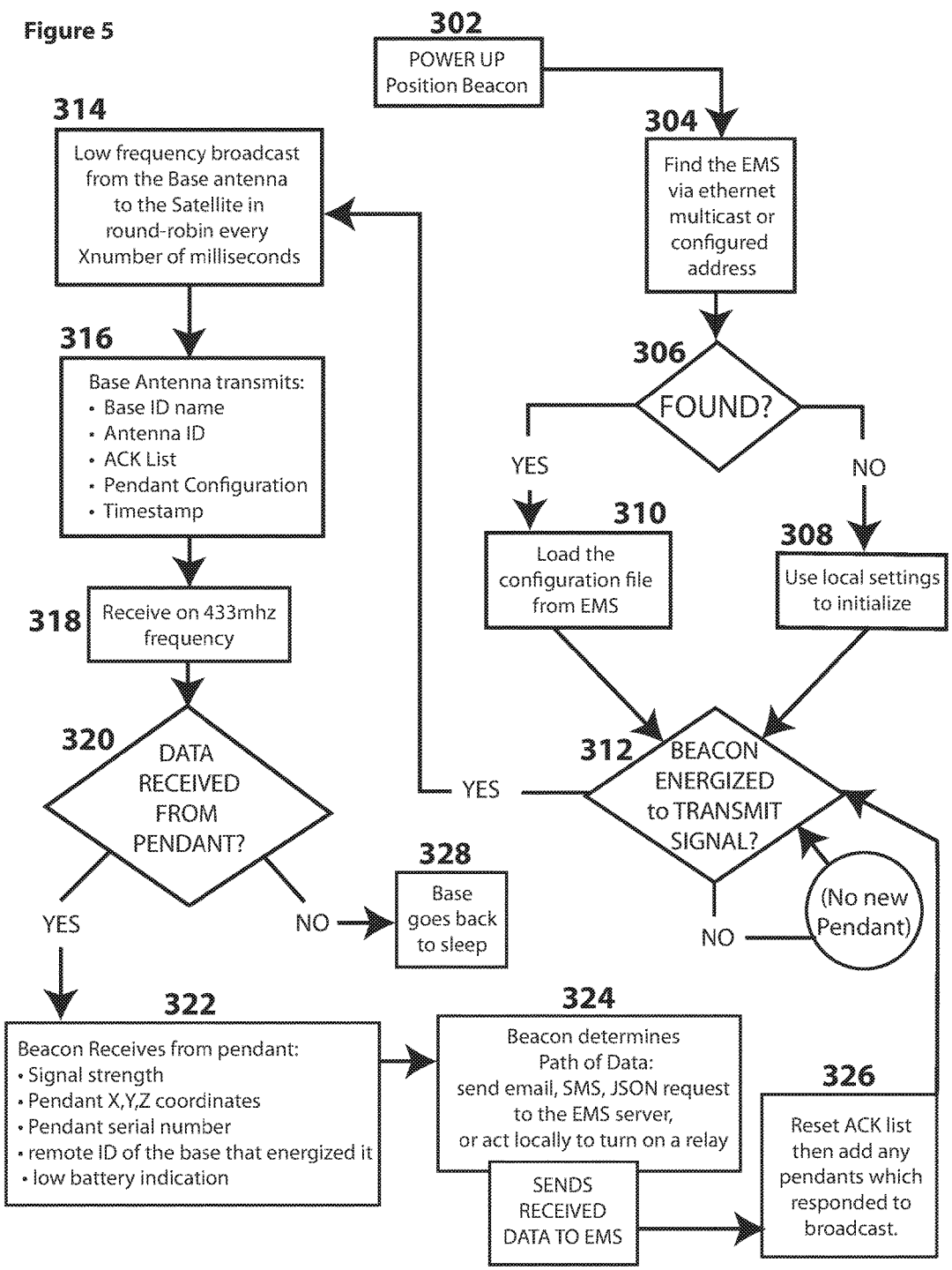
FIG. 5 is a flowchart of an operation of a beacon device, in accordance with some embodiments.

FIG. 5 is a flowchart of an operation of a beacon device, in accordance with some embodiments. Some or all of the steps in the flowchart may be performed at one or more elements shown and described with reference to FIGS. 1-4.

At step 302, the position beacon device 110 is powered up via a 24 volt power source. It can be via its barrel connector or from a red/black pair from an external power supply.

At step 302, Upon initialization the position beacon device 110 supports the Azure protocol or the like and will send a multicast, for example, out on address 224.0.0.251, looking for a server or application that can automatically find any beacon device 110 that is on the network via a protocol, such as Azure protocol, or other communication element for managing the device.

At decision diamond 306, a determination is made whether there is a response to the multicast server request. If yes, then the method proceeds to step 310, where the configuration files are loaded from the EMS server 150. If no, then the method proceeds to block 308, where the local settings are used to initialize. Here, the beacon device 110 may have configuration parameters stored in flash memory or the like. If it does not get them via the EMS server 150, then the beacon device 110 will just use its local settings that were programmed via the web interface.

At decision diamond 312, a determination is made whether the beacons antenna is energized to transmit an energizing signal, such as a 125 kHz signal or the like, but not limited thereto. For example, other frequencies may equally apply, such as 303 mHz in the ISM band.

If yes, then the method proceeds to step 314 where the energizing signal is broadcast from the mPB antenna and then goes round robin to any mPS antenna's every X number of milliseconds which is configurable. If no, then No Sleep or stop energizing antenna until timer expires.

At step 316, the antenna transmits its Base ID name, Its antenna ID, Its lists of pendants that has sent in Supervision messages to it (Ack List), Pendant Config if programmed, timestamp. At step 318, receipt is made of an ISM frequency, such as 433 mhz.

At decision diamond 320, a determination is made whether data is received from the pendant 130. If yes, the method proceeds to step 322, where a beacon received from the pendant the signal strength, x-y-z coordinates, the pendant serial number, the beacon device identification, and remote ID of the beacon device or satellite device that energized it, if the low battery indication is set. If no, then it goes to sleep 328 and the method returns to step 312.

At step 324, the beacon device 110 determines what to do with the data, for example, determines whether a message should be output such as SMS, JSON message to the EMS server 150, or to act locally and activate a relay, similar to a door striker.

At step 326, An Ack list is reset. Any pendants that respond to the broadcast may be added. The method may proceed to step 312.

FIG. 7 is a flowchart of an operation of a pendant 130, in accordance with some embodiments. Some or all of the steps in the flowchart may be performed at one or more elements shown and described with reference to FIGS. 1-4 and 6.

At step 502, a pendant 130 wakes up. The pendant 130 may wake up for different reasons, for example, whenever it notices a beacon location change, or it wakes up in reduced power mode to ensure there has not been a change.

At decision diamond 504, a determination is made whether the pendant 130 has been energized from an antenna of a beacon device 110 and/or a satellite device 120. If yes, the method proceeds to step 514, where the pendant 130 receives data in the beam. The data may include but not be limited to the Base ID or name, Remote Ack List containing all of the pendants that are in its Acknowledgement list, and a time stamp.

At decision diamond 518, the pendant 130 determines if it is the same antenna that initialized it the last time. If yes, then at step 520, check if the time is over X seconds. If no, at step 528, the pendant 130 enters a sleep mode. If yes, at step 522 it transmits a supervisory frame to the beacon device 110.

At step 524, it first chooses a time slot to transmit the frame on, sends the signal strength of the beam, sends the serial number of itself, the base ID and remote ID that energized it, low battery indication. At step 528, the pendant 130 enters a sleep mode.

Returning to decision diamond 504, if the determination is made that the pendant 130 has been energized, then the method proceeds to step 506, where a determination is made whether the pendant 130 has been activated, e.g., whether the button 252 has been pressed. If no, then the method returns to step 504. If Yes, the at step 508, a transmission is initiated from the pendant 130, including at step 510 but not limited to a serial number, low battery indication, and set the event ID to alarm. At step 512, the pendant 130 enters a sleep mode.

As described herein, a pendant button is only used manually by the person using it when they need help which will generate an "alarm" event or message back to the beacon. When it is in "passive" mode", it generates supervisory messages back to the beacon device 110 when there has been a movement from one beacon device 110 to another beacon device 110 or satellite device 120. For example, the system may be implemented in two wings of a building, and there is an interest is identifying the location of a person in the building, in particular, which wing. Here, the beacon device 110 and satellite device 120 may all be named the same device, e.g., device ID=1, so that any time they report back data may indicate "wing 1 id 1" or "wing 2 id 1", where the wing is the beacon ID. However if a beacon device 110 is placed on one side of a door and a satellite device 1120 is placed on the other side of the door, then the system prefers to understand that the pendant 130 communicated with the satellite device 120, and it would report back as ID 2 as part of a predetermined configuration. Without this feature, if people walk around the facility you don't know where they are unless they press the button. Embodiments of the inventive concepts provide for, as they walk throughout the facility, the pendant 130 makes supervisory calls back to the server 150 letting it know where that pendant 150 is positioned within a facility. If the same pendant did not have a button 252 but instead included assets as well so they can find the wheelchair or other object that is always missing or the oxygen pump that is expensive and they want to know if it is walking out the door. The lower the frequency, the lower the battery power needed to listen to that frequency. The pendant 130 when it comes in range of the 125 kHz not mHZ it wakes up and determines if it is the same antenna that woke it up the previous time or not. If it is then it goes back to sleep, if it isn't then it makes a supervisor call over 433 mhz which taxes the battery just like if someone presses the button.

A related feature is that the battery has an extraordinary long battery life, since it doesn't have to chirp or broadcast at full power when it comes into the proximity of a beacon device 110. Instead, the pendant 130 "wakes up" whenever it notices a beacon location change, or it wakes up in reduced power mode to ensure there has not been a change.

What is claimed is:
1. A system for positioning, comprising:
a position beacon device that generates an energizing signal, and includes an antenna that is energized to output the energizing signal for energizing at least one electronic device;
at least one satellite beacon device that extends the range of the energizing signal; and
an event management server that tracks location changes of the at least at one electronic device in response to the energizing at least one electronic device being energized by the energizing signal.

2. The system of claim 1, wherein the position beacon device communicates with the at least one electronic device over a 433 MHz communication in response to the at least one electronic device being excited by the energizing signal received from the position beacon device or the at least one satellite beacon device at a 125 kHz frequency.

3. The system of claim 1, wherein the at least one satellite beacon device communicates with the position beacon device to increase the range of an area to be monitored.

4. The system of claim 1, wherein the at least one satellite beacon device is powered from the position beacon device.

5. The system of claim 1, wherein the energizing signal includes a low frequency energizer radio frequency identification (RFID) wakeup beam.

6. The system of claim 1, wherein the at least one satellite beacon device outputs a unique identifier to the position beacon device which in turn transmits data to the event management server in order to distinguish whether the at least one electronic device is closer the position beacon device or the at least one satellite because device based upon a signal strength in the event that both the position beacon device and at least one satellite beacon device establish a communication with the at least one electronic device.

7. The system of claim 1, wherein the position beacon device includes a processor that polls the antenna and antennas of the at least one satellite beacon device, for changes in an ACK list of the at least one electronic device, permitting the position beacon device to inform the event management server of the location changes.

8. The system of claim 7, wherein in response to a failure to detect the event management server, information regarding the location changes is generated and output as an electronic message.

9. A system for positioning, comprising:
a position beacon device that generates an energizing signal; and
at least one electronic device that is energized by the energizing signal, and further includes a button that when pressed generates a signal to provide a last beacon ID that energized it to determine a location of the at least one electronic device, the at least one electronic device contacting the position beacon device in response to being energized by the energizing signal.

10. The system of claim 9, further comprising an event management server that receives data regarding the location of the at least one electronic device in response to the at least one electronic device being energized by the energizing signal.

11. The system of claim 9, further comprising at least one satellite beacon device that extends the range of the energizing signal.

12. The system of claim 9, wherein the position beacon device communicates with the at least one electronic device over a 433 MHz communication in response to the at least one electronic device being excited by the energizing signal received from the position beacon device at a 125 kHz frequency.

13. The system of claim 9, wherein the at least one electronic device determines whether to make a supervisory call to the position beacon device in order to alert the server that a new electronic device has been energized by the beacon that has come into its proximity, and wherein the signal uses a different Industrial, Scientific or Medical (ISM) frequency to call the position beacon device.

14. The system of claim 9, wherein a supervisory signal is generated by the at least one electronic device when it thinks it encountered a new beacon, wherein if the at least one electronic device stays under the same beacon it should not generate a lot of supervisory calls which increases battery life.

15. The system of claim 9, wherein the position beacon device includes an antenna that is energized to output the energizing signal for energizing at least one electronic device, and wherein in response the at least one electronic device responds to the position beacon device, which in turn generates and outputs a data packet with information that an event has occurred.

16. A system for positioning, comprising:
a plurality of position beacon devices that each tracks a plurality of electronic devices constructed and arranged to include a button that when activated generates a signal that serves as a call for help, each position beacon device further constructed and arranged to listen for events corresponding to the signal generated when the button is activated, each position beacon device further constructed and arranged to output an energizing signal for energizing the electronic devices; and
an event management server that manages communications received from the position beacon devices and ascertains a position and distance of the electronic devices from the position beacon devices.

17. The system of claim 16, wherein the position beacon devices listen for the events at or about a 433 MHz frequency.

\* \* \* \* \*